(No Model.)
E. A. SPERRY.
POWER TRANSMITTING DEVICE.
No. 587,019.  Patented July 27, 1897.
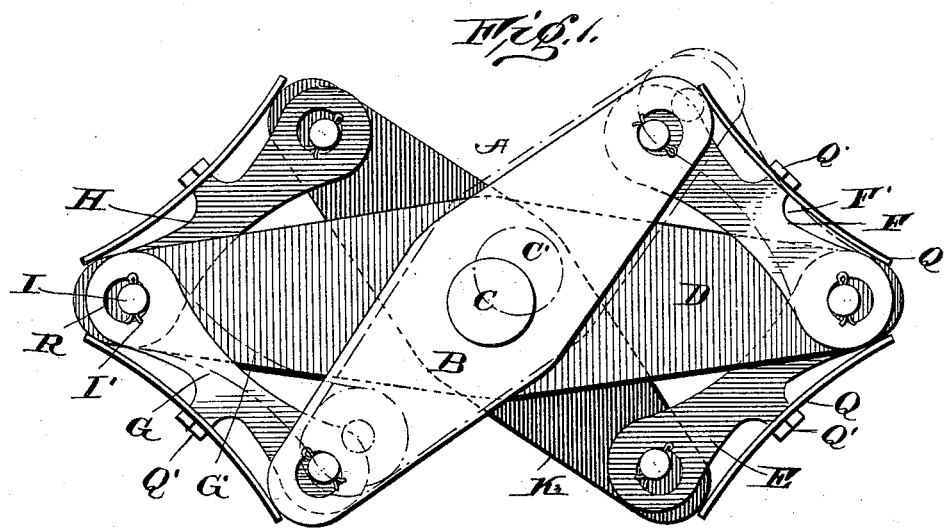
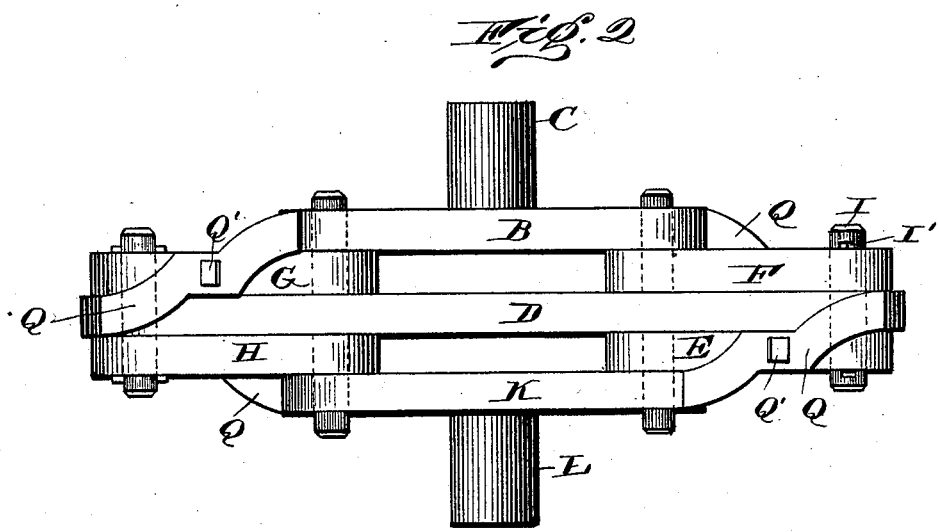
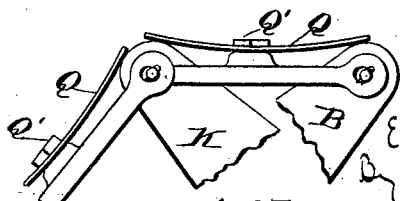
Witnesses:
J. M. Fowler
B. B. Hull
Inventor
Elmer A. Sperry
By Geo. R. Blodgett
Attorney

UNITED STATES PATENT OFFICE.

ELMER A. SPERRY, OF CLEVELAND, OHIO, ASSIGNOR, BY MESNE ASSIGNMENTS, TO THE GENERAL ELECTRIC COMPANY, OF NEW YORK.

POWER-TRANSMITTING DEVICE.

SPECIFICATION forming part of Letters Patent No. 587,019, dated July 27, 1897.

Application filed March 6, 1893. Serial No. 464,651. (No model.)

*To all whom it may concern:*

Be it known that I, ELMER A. SPERRY, a citizen of the United States, residing at Cleveland, in the county of Cuyahoga and State of Ohio, have invented a new and useful Improvement in Torque-Transmitting Devices, of which the following is a specification.

My invention relates to torque-transmitting devices, and has for its object to provide a device of this character which shall be capable of transmitting torque or angular displacement and yet be at the same time capable of radial movements and also of slight relatively angular movements, such as those caused in a flexible clutch or coupling between two shafts which may be slightly out of parallelism or out of alinement either angularly or in parallel planes. The displacements which I have named are generally of small extent, and therefore it is to be understood that my device is operative only within certain limits necessitated by its mechanical construction.

In such apparatus it has been customary to allow considerable lost motion in the various joints of the apparatus, and the present invention refers particularly to means for taking up the said lost motion and preventing rattling of the device at the joints of the various coupling members; and the invention therefore consists in the matters hereinafter described, and referred to in the appended claims.

In the accompanying drawings, which illustrate the invention, Figure 1 is a side elevation showing, with one member in two different positions, a transmitting device embodying my invention. Fig. 2 is a plan of the parts shown in Fig. 1, and Fig. 3 is a detail view of a portion of Fig. 1.

In the drawings the torque-transmitting device consists of a coupling member B, a second coupling member K at substantially right angles thereto, though it need not necessarily be a right angle, and to each of these coupling members is affixed a shaft, as C and L. In Fig. 1 both shafts are not illustrated, for when in the full-line position they are in alinement one with the other, and therefore are best shown in Fig. 2.

D represents a bar which passes between the two coupling members B and K and acts to prevent a displacement of the two sets of coupling members except in certain different directions. Connecting each end of the coupling members B and K with the end of the bar or equalizer D are secondary coupling members E, F, G, and H. Pins I pass through the various coupling members and are provided with cotters I', securing the two parts together.

By referring to the dotted position in Fig. 1, which represent a motion of the shaft C out of position, it will be seen that when the coupling member B, carrying the shaft C, moves toward the right into the dotted position indicated by the circle at C' the coupling members G and F, connected to the coupling member B, swing into dotted-line positions G' F', respectively. So, also, it will be with reference to the coupling member K, in which the secondary coupling members E and H will swing into their positions. (Not herein shown.) If, however, in the construction shown in Fig. 1 the coupling member B tends to rotate about the shaft C as an axis, then it will tend to either compress or extend the coupling members F G and will therefore transmit torque to the equalizer D, through the equalizer to the coupling members E and F, through those coupling members to the coupling member K, and thus to the shaft L. The shaft C is free to move within reasonable limits along the line joining the centers to which the coupling members F G B rotate, while the shaft L is free to move on the line between the centers about which rotate the coupling members E H K, while, as before pointed out, any twist or torque in either shaft is immediately transmitted to the other one.

For the purpose of preventing rattling of the device and to take up lost motion at the joints of the coupling members I provide springs Q, joined by bolts Q' and the coupling members, which, as hereinbefore intimated, have in the eyes at R a little lost motion, giving a greater flexibility to the device.

Having thus described my invention, what I claim, and desire to secure by Letters Patent, is—

1. In combination, coupling members attached to shafts, secondary coupling members flexibly connected thereto and having lost motion in the connection, and springs taking up the lost motion attached to one of the coupling members and bearing upon the other, substantially as described.

2. In combination, a central link having a shaft attached thereto, secondary links attached to the central link, a second central link having a shaft attached thereto, secondary links attached to the second central link, an equalizer connecting the outer end of the secondary links, all of the connections being flexible and having lost motion in the connection, and means for taking up said lost motion and preventing rattling of the device, substantially as described.

ELMER A. SPERRY.

Witnesses:
M. NIELSON,
W. H. JACOB.